US005619125A

United States Patent [19]

Lakshmikumar

[11] Patent Number: 5,619,125

[45] Date of Patent: Apr. 8, 1997

[54] VOLTAGE-TO-CURRENT CONVERTER

[75] Inventor: Kadaba R. Lakshmikumar, Wescosville, Pa.

[73] Assignee: Lucent Technologies Inc., Murray Hill, N.J.

[21] Appl. No.: 509,072

[22] Filed: Jul. 31, 1995

[51] Int. Cl.[6] .............................. G05F 3/16; G05F 3/20; H02M 7/00

[52] U.S. Cl. .............................. 323/315; 363/73

[58] Field of Search .............................. 323/312, 315, 323/316; 363/73

[56] References Cited

U.S. PATENT DOCUMENTS

| | | | |
|---|---|---|---|
| 4,937,516 | 6/1990 | Sempel | 323/315 |
| 4,942,369 | 7/1990 | Nakagawara et al. | 330/296 |
| 4,961,046 | 10/1990 | De Jager | 323/315 |
| 5,146,188 | 9/1992 | Suwada et al. | 331/111 |
| 5,241,227 | 8/1993 | Jung et al. | 307/520 |

*Primary Examiner*—Peter S. Wong

*Assistant Examiner*—Bao Q. Vu

[57] ABSTRACT

Briefly in accordance with one aspect of the present invention, a voltage-to-current converter for converting an input voltage signal to an output current signal, exhibits a substantially linear voltage/current characteristics over the entire available voltage signal range. The voltage-to-current converter comprises a first voltage-to-current converter having a substantially linear voltage/current characteristic for input voltage signals smaller than a first reference voltage signal level and up to substantially the minimum voltage signal level generated by a DC power supply employed to drive the voltage-to-current converter. A second voltage-to-current converter has a substantially linear voltage/current characteristic for voltage input signals larger than a second reference voltage signal level and up to substantially the maximum voltage signal level generated by the DC power supply. A control circuit is coupled to activate the first voltage-to-current converter, when the input voltage signal is smaller than the first reference voltage signal, and to activate the second voltage-to-current converter when the input voltage signal is larger than the second reference voltage signal level.

18 Claims, 6 Drawing Sheets

VOLTAGE-TO-CURRENT CONVERTER

RELATED APPLICATIONS

This patent application is related to concurrently filed patent application Ser. No. 08/509,563, entitled "MPSK DEMODULATOR," (Dwarakanath 6-4-1-13-1) by M. R. Dwarakanath et.al, and incorporated herein by reference; concurrently filed patent application Ser. No. 08/509,073, entitled "RING OSCILLATOR," (Lakshmikumar 5) by K. Lakshmikumar, and incorporated herein by reference; and concurrently filed patent application Ser. No. 08/509,562, entitled "WIDE BAND CONSTANT GAIN AMPLIFIER," (Nagaraj 15) by K. Nagaraj, and incorporated herein by reference.

TECHNICAL FIELD

This invention relates to signal converters, and, more specifically, to a voltage-to-current converter.

BACKGROUND OF THE INVENTION

Voltage-to-current converters are used in many electronic applications. In some of these applications it is desired to generate a current signal in response to an input voltage signal. Conventional voltage-to-current converters may only respond linearly to input voltage signals within a voltage range that is smaller than the entire voltage range generated by a direct current (DC) power supply that drives the voltage-to-current converter. For example, a phase-locked loop may include a voltage-to-current converter that provides a current signal to a current-controlled oscillator in response to a control voltage signal.

Thus, a need exists to provide a voltage-to-current converter that has a substantially linear current/voltage characteristic over substantially the entire range of a DC power supply voltage signal.

SUMMARY OF THE INVENTION

Briefly in accordance with one embodiment of the present invention, a voltage-to-current converter for converting an input voltage signal to an output current signal, comprises: a first voltage-to-current converter having a substantially linear voltage/current characteristic for voltage input signals smaller than a first reference voltage signal level; a second voltage-to-current converter having a substantially linear voltage/current characteristic for voltage input signals larger than a second reference voltage signal level; and a control circuit coupled to the first and second voltage-to-current converters, the control circuit being adapted to activate the first voltage-to-current converter and deactivate the second voltage-to-current converter when the input voltage signal is smaller than the first reference voltage signal level, the control circuit being further adapted to activate the second voltage-to-current converter and deactivate the first voltage to current converter when the input voltage signal is larger than the second reference voltage signal level.

Briefly in accordance with another embodiment of the invention, a method for converting an input voltage signal to an output current signal, comprises the steps of: generating a first output current signal in response to input voltage signals having an amplitude less than a first reference voltage signal such that the first output current signal is a substantially linear function of the input voltage signals; generating a second output current signal in response to the input voltage signals having an amplitude larger a second reference voltage signal such that the second current signal is a substantially linear function of the input voltage signals; and combining the first and second output current signals so as to provide a substantially linear signal over a wide range of input voltage signals substantially ranging from zero volts to a voltage level provided by a voltage power supply.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 7:
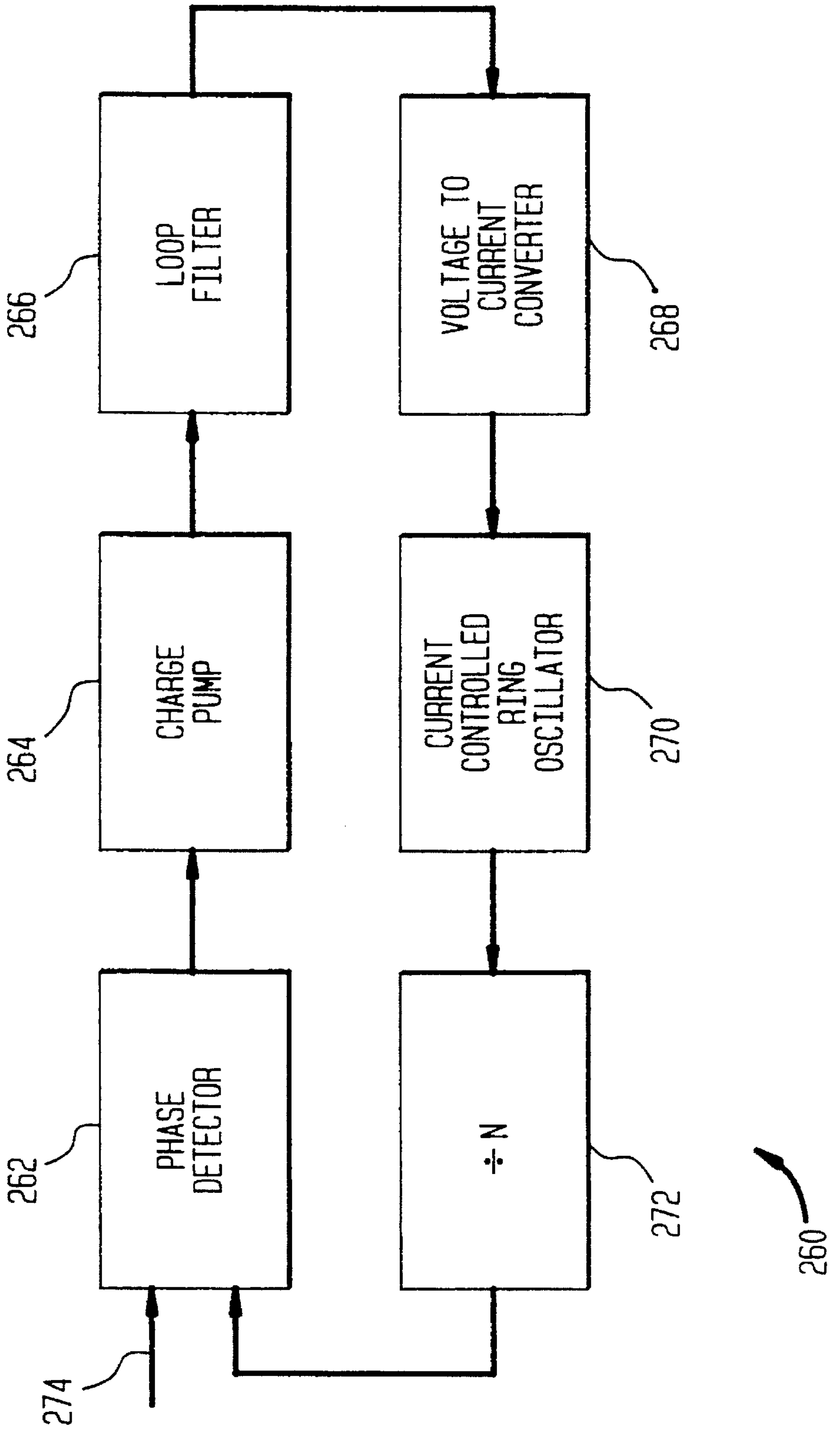
FIG. 7 illustrates a block diagram of a phase-locked-loop that may incorporate an embodiment of a voltage-to-current converter in accordance with the present invention.

As previously indicated, a voltage-to-current converter in accordance with the invention, may be employed in a phase-locked loop, although the invention is not limited in scope in this respect. FIG. 7 illustrates one such phase-locked loop 260 having a phase detector 262, a charge pump 264, a loop filter 266, a voltage-to-current converter 268, a current-controlled ring oscillator 270, and a frequency divider 272. In one application of a phase-locked loop, the phase detector receives a clock reference signal 274 as an input signal. Current-controlled ring oscillator 270 generates a signal that has a frequency which is approximately a multiple of the frequency of the clock reference signal.

In certain phase-locked loop applications, it is desirable to use a voltage-to-current converter that has a substantially linear voltage/current characteristic over substantially the entire available voltage signal range, so as to generate a given or predetermined number of phase-shifted clock signals, having substantially the same frequency. For example, in concurrently filed patent application, incorporated by reference herein, entitled "MPSK DEMODULATOR" (Attorney Docket "Dwarakanath 6-4-1-13-1), by Dwarakanath et al., filed on Jul. 31, 1995, assigned to the same assignee of the present invention, a multiphase frequency generator is used that provides a predetermined number of phase shifted clock signals.

Furthermore, in applications where the amplitude of the operating direct current (DC) voltage supply signal is relatively small, such as three volts, for example, a voltage-to-current converter that exhibits a substantially linear characteristic over substantially the entire range of input voltage signals is even more desirable. This follows, because the available dynamic range of input voltage signal is, at least in part, limited to the amplitude of the voltage supply signal. With a voltage-to-current converter that has a substantially linear current/voltage characteristic, the phase-locked loop may remain in a stable condition in response to phase-locked loop input signals having a wide range of frequencies. As the frequency of input signal varies, so does the input voltage signal applied to voltage-to-current converter 268. However, because the characteristic of converter 268 remains substantially linear, the phase-locked loop may be able to operate over a wider range of input signals, and still exhibit the same dynamic behavior.

Figure 2A:
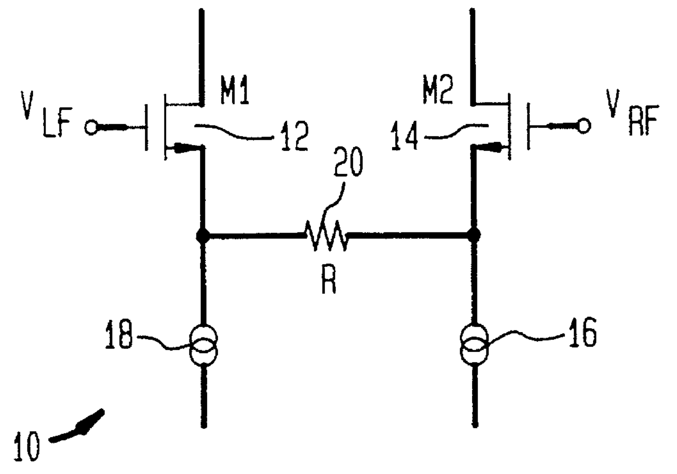
FIG. 2A (PRIOR ART)
FIG. 2*a* illustrates a schematic diagram of a prior art voltage-to-current converter.

FIG. 2*a* illustrates a conventional voltage-to-current converter 10 comprising of two n-channel MOSFET transistors 12 and 14. The sources of these transistors are coupled to each other through a resistor 20. The sources of the transistors are also coupled to current sources 16 and 18, which provide two current signals of substantially the same amplitude to each transistor 14 and 12, respectively. Current sources 16 and 18 may have one of the many available design arrangements, such as a MOSFET transistor operating in its saturation region or a BIPOLAR transistor operating in its active region. Typically, transistors operating in the aforesaid regions exhibit a substantially constant current signal for a wide range of voltage signal amplitudes across the transistor. The operation of such current sources are well-known and described in *Analog Integrated Circuits*, by Sidney Soclof (Prentice-Hall, 1985), incorporated herein by reference.

A reference voltage source, $V_{RF}$, is applied to the gate of transistor 14. A variable input voltage signal, $V_{LF}$, is applied to the gate of transistor 12. With reference to FIG. 7, $V_{LF}$ is the output voltage signal provided by loop filter 266. However, in this context, $V_{LF}$ is referred to as any input voltage signal, in response to which, a voltage-to-current converter generates an output current signal. The output current signal of voltage-to-current converter 10 at either drains of transistors 12 or 14 varies in response to variations of input voltage signal $V_{LF}$.

During the operation of voltage-to-current converter 10, when input voltage signal, $V_{LF}$, is substantially equal to reference voltage signal, $V_{RF}$, the current signal at the drains and sources of transistors 12 and 14 becomes substantially equal. Thus, essentially, no current flows through resistor 20. However, when input voltage signal, $V_{LF}$, is different from reference voltage signal, $V_{RF}$, the current signals at the drains and sources of transistors 12 and 14 will have different amplitudes. This difference of current results in a current signal flow through resistor 20. It will be appreciated that without resistor 20, the current signals at the drains of transistors 12 and 14 remain substantially constant and approximately equal to the amplitude of current generated by current sources 18 and 16, respectively.

Figure 2B:
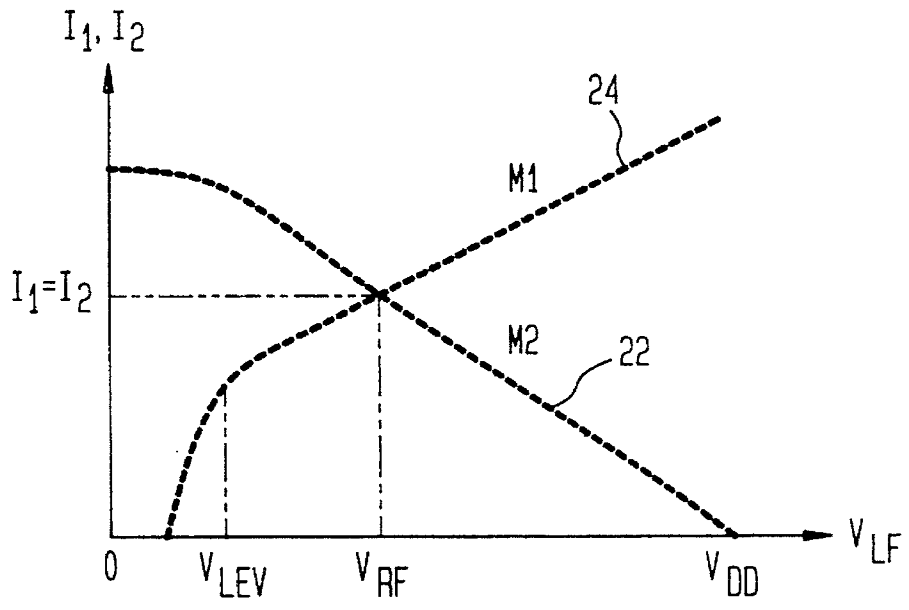
FIG. 2B (PRIOR ART)
FIG. 2*b* is a plot illustrating the current/voltage characteristic of the voltage-to-current converter of FIG. 2*a*.

FIG. 2*b* is a plot of output current signals $I_1$ and $I_2$ versus $V_{LF}$, wherein $I_1$ is the output current signal at the drain of transistor 12, illustrated by curve 24. $I_2$ is the output current signal at the drain of transistor 14, illustrated by curve 22. $V_{LF}$ varies from zero volts to $V_{DD}$, wherein $V_{DD}$ is the amplitude of a voltage power supply signal(not shown), that drives the transistors and current sources of voltage-to-current converter 10. As illustrated, the current/voltage characteristic of converter 10 is substantially linear for input voltage signals, $V_{LF}$, that have a magnitude larger than a predetermined voltage signal, $V_{LEV}$, where $V_{LEV}$ can be expressed as $V_{LEV}=V_T(12)+V_{SAT}(18)$. $V_T(12)$ is the threshold voltage signal of transistor 12 below which the transistor does not operate and, $V_{SAT}$, is the saturation voltage signal across current source 18, below which current source 18 may not operate in its saturation region. As illustrated for input voltage signals, $V_{LF}$, that have an amplitude less than $V_{LEV}$, the current/voltage characteristic of converter 10 is nonlinear.

Figure 3A:
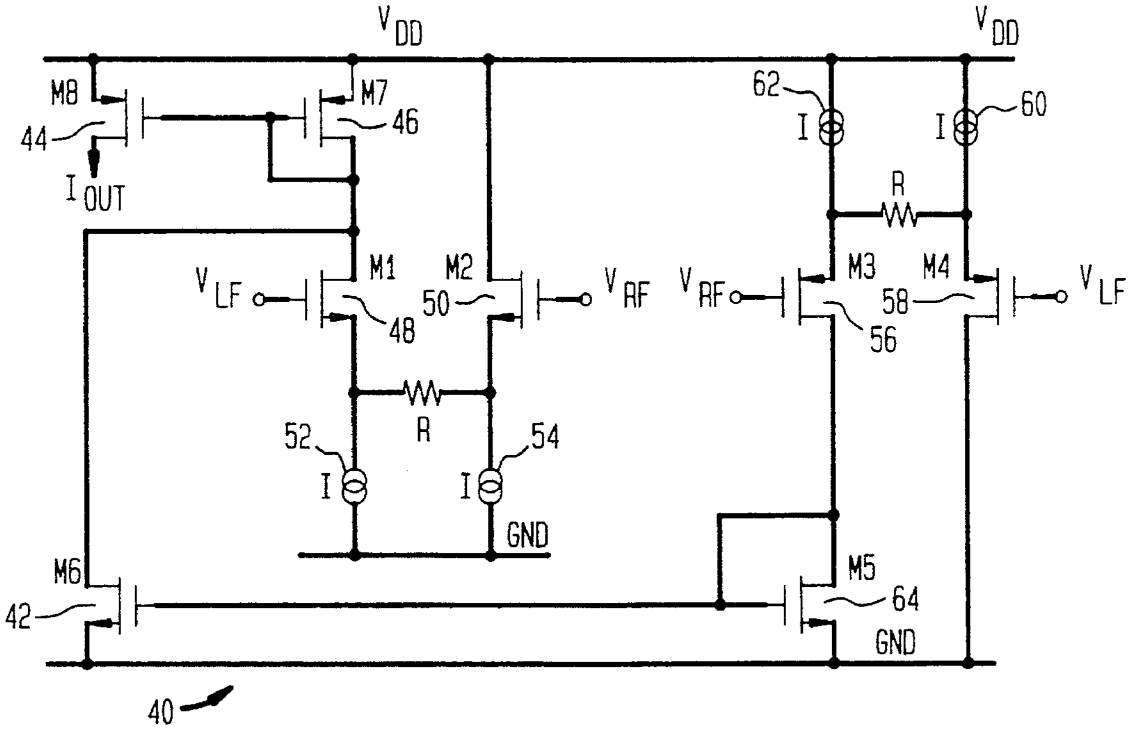
FIG. 3*a* illustrates a schematic diagram of one embodiment of a voltage-to-current converter in accordance with the present invention.

FIG. 3*a* illustrates a voltage-to-current converter 40 in accordance with the present invention. The voltage-to-current converter includes an n-channel and a p-channel voltage-to-current converter, working in combination, as described in more detail, hereinafter. A resistor R is coupled between the sources of transistors 48 and 50. In this context, all resistors described herein are referred to as "R." It will be appreciated that the resistance of these resistors may not necessarily have exactly the same value, although they are referred to as such. The input voltage signal, $V_{LF}$, is applied to the gate of transistor 48, while a fixed reference voltage, $V_{RF}$, is applied to the gate of transistor 50. Transistors 48 and 50 are biased by substantially equal valued current sources 52 and 54, respectively. The drain of transistor 48 is coupled to a current mirror formed by transistors 46 and 44. The drain and the gate of p-channel transistor 46 are coupled to each other and to the drain of transistor 48. The rate of transistor 46 is coupled to the gate of p-channel transistor 44. The drain of transistor 44 provides the output current signal of voltage-to-current converter 40.

Similarly, p-channel transistors 56 and 58 form a separate voltage-to-current converter. Thus, a resistor R is coupled between the sources of p-channel transistors 56 and 58. Input voltage signal $V_{LF}$ is applied to the gate of transistor 58, while a reference voltage signal, $V_{RF}$, is applied to the gate of transistor 56. Transistors 56 and 58 are biased by substantially equal valued current sources 62 and 60, respectively. The drain of transistor 56 is coupled to a current mirror formed by n-channel transistors 64 and 42. The gate and drain of transistor 64 are coupled together and to the drain of transistor 56. The gates of transistors 64 and 42 are also coupled together. The drain of transistor 42 is coupled to the drain of transistor 46. Thus, the output current signal, $I_{OUT}$, of converter 40 is the combination of currents generated by the previously described n-channel voltage-to-current converter and p-channel voltage-to-current converter.

Figure 3B:
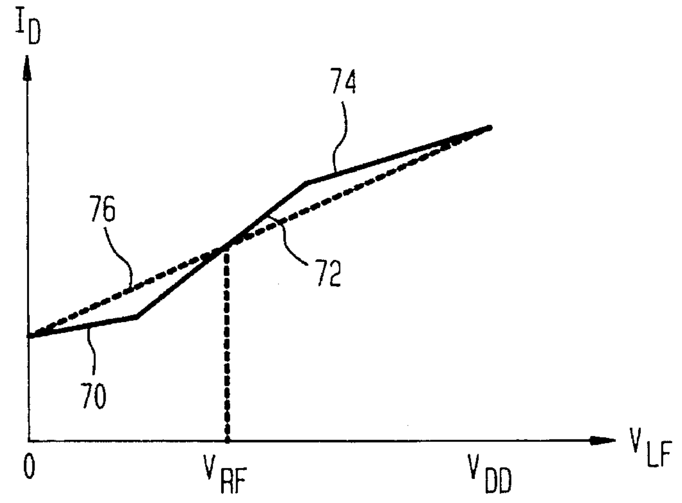
FIG. 3*b* is a plot illustrating the current/voltage characteristic of the embodiment of FIG. 3*a*.

The current/voltage characteristic of the p-channel voltage-to-current converter remains substantially linear for input voltage signals, $V_{LF}$, having an amplitude approximately ranging from zero volts to $(V_{DD}-V_{LEV})$ (not shown), above which current source 60 may not operate properly, as explained previously in reference with FIG. 2*a*. The current/voltage characteristic of the n-channel voltage-to-current converter remains substantially linear for input voltage signals, $V_{LF}$, having an amplitude approximately ranging from $V_{LEV}$ to $V_{DD}$. FIG. 3*b* is a plot illustrating the output current signal $I_{OUT}$ as a function of input voltage signal, $V_{LF}$. AS illustrated, the output current signal curve comprises three regions 70, 72 and 74. For region 70, p-channel voltage-to-current converter is operating, and, therefore, the output current signal in this region is substantially attributable to the current signal generated at the drain of transistor 56 of FIG. 3*a*. For region 72, both p-channel and n-channel voltage-to-current converters are operating and the output current signal is substantially attributable to current signals generated at the drain of transistor 56 and at the drain of transistor 48 of FIG. 3*a*. For region 74, n-channel voltage-to-current converter is operating, and the output current signal is substantially attributable to the current generated at the drain of transistor 48. The slope in the region 72 is about twice as much as the slopes in the regions 70 and 74. Although the current/voltage characteristic of voltage-to-current converter 40 is substantially linear in individual regions of its operation, the combined characteristic over the entire range of input voltage signal, $V_{LF}$, is not linear. In accordance with another embodiment of the present invention, a voltage-to-current converter is described hereinafter, that has a substantially linear current/voltage characteristic illustrated by curve 76 of FIG. 3*b*.

Figure 1:
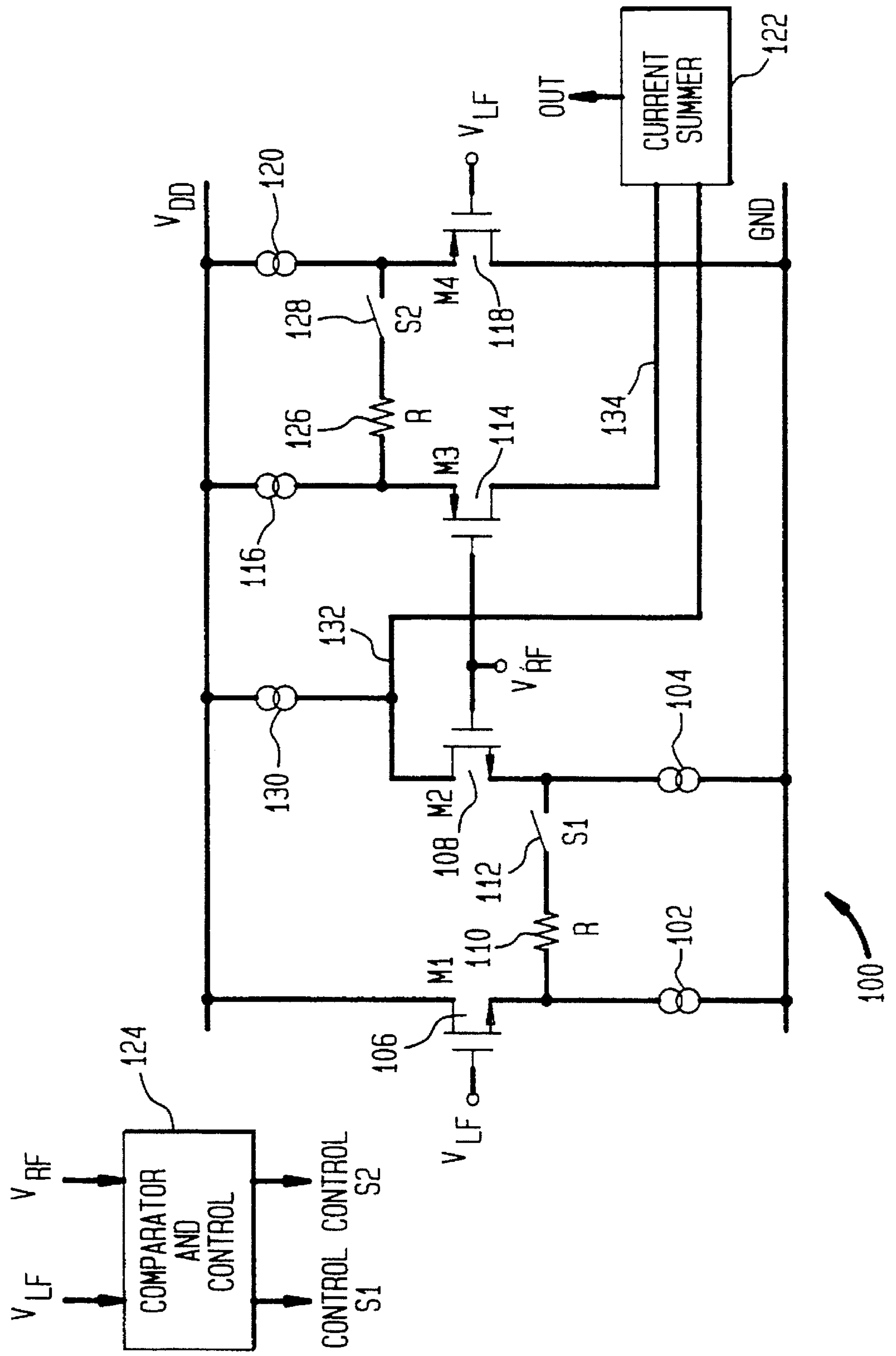
FIG. 1 illustrates a schematic diagram of one embodiment of a voltage-to-current converter in accordance with the present invention.

FIG. 1 illustrates a voltage-to-current converter 100, in accordance with the present invention, although the invention is not limited in scope to this embodiment. Voltage-to-current converter 100 includes a n-channel and a p-channel voltage-to-current converter with a current summer that combines the currents generated by the respective voltage-to-current converters. The n-channel voltage-to-current converter has a similar arrangement as the circuit described with reference to FIG. 3*a*. However, instead of using the current generated at the drain of transistor 48 (FIG. 3*a*), which is coupled to input voltage signal, $V_{LF}$, converter 100 in FIG. 1, uses the current generated in the drain of transistor 108, which is coupled to predetermined reference voltage signal, $V_{RF}$. A resistor 110 is coupled between the sources of transistors 106 and 108. The input voltage signal, $V_{LF}$, is applied to the gate of transistor 106, while a reference voltage, $V_{RF}$, is applied to the gate of transistor 108. Transistors 106 and 108 are biased by substantially equal valued current sources 102 and 104, respectively. The drain of transistor 108 is coupled to a current source 130 and to a current summer 122, via a signal line 132. The amplitude of current signal generated by current source 130 is substantially twice as large as the amplitude of current generated by current sources 102 and 104. The amplitude of current signal in signal line 132 is substantially equal to the amplitude of current signal generated by current source 130 minus the amplitude of current signal generated at the drain of transistor 108. The current summer provides the output current signal of voltage-to-current converter 100.

Similarly, p-channel transistors 114 and 118 form a voltage-to-current converter. Thus, a resistor 126 is coupled between the sources of p-channel transistors 114 and 118. The input voltage signal, $V_{LF}$, is applied to the gate of transistor 118, while reference voltage signal, $V_{RF}$, is applied to the gate of transistor 114. Transistors 114 and 118 are biased by substantially equal valued current sources 116 and 120, respectively. The drain of transistor 114 is coupled to current summer 122, via signal line 134. Thus, the output current signal, $I_{OUT}$, of converter 100 is the sum of current signals provided in current signal lines 132 and 134, and in effect is a combination of current signals provided by the n-channel voltage-to-current converter and the p-channel voltage-to-current converter. It will be appreciated that in another embodiment of the voltage-to-current converter in accordance with the present invention, the drain of transistor 108 may be coupled directly to a power supply voltage signal, $V_{DD}$, and the drain of transistor 106 may be coupled to current signal line 132. In that embodiment (not shown), current source 130 is not necessary and may be omitted from the voltage-to-current converter design.

Resistors 110 and 126 of voltage-to-current converter 100 are configured to be switched in and out of the n and p-channel converters. A switch 112 is coupled in series with resistor 110 and a switch 128 is coupled in series with resistor 126. A comparator and control circuit 124 controls the operation of switches 112 and 128. The comparator and control circuit is configured such that when $V_{LF}>V_{RF}$, switch 112 is activated and switch 128 is deactivated. As a result, resistor 110 in the n-channel voltage-to-current converter provides an electrical path between the sources of transistors 106 and 108, and resistor 126 in the p-channel voltage-to-current converter does not provide an electrical path between the sources of transistors 114 and 118. The activation of switch 112, so as to provide an electrical path between the sources of transistors 106 and 108, in effect, activates the operation of the n-channel transistor pair 106 and 108 as a voltage-to-current converter. The n-channel transistor pair provides a substantially linear current/voltage characteristic. Meanwhile, deactivation of switch 128, so as not to provide an electrical path between the sources of transistors 114 and 118, in effect, deactivates the operation of the p-channel transistor pair 114 and 128 as a voltage-to-current converter. For input voltage signals, $V_{LF}$, that have an amplitude larger than reference voltage signal, $V_{RF}$, the p-channel transistor pair provides a substantially constant current signal.

The comparator and control circuit 124 is also configured such that when $V_{LF}<V_{RF}$, switch 128 is activated and switch 112 is deactivated. Resistor 110 in the n-channel voltage-to-current converter does not provide an electrical path between the sources of transistors 106 and 108. Resistor 126 in the p-channel voltage-to-current converter provides an electrical path between the sources of transistors 114 and 118. Activating switch 128, in effect, activates the operation of p-channel transistor pair 114 and 128 as a voltage-to-current converter. The p-channel transistor pair provides a substantially linear current/voltage characteristic. Meanwhile, deactivating switch 112, in effect, deactivates the operation of n-channel transistor pair 106 and 108 as a voltage-to-current converter. For input voltage signals, $V_{LF}$, that have an amplitude smaller than reference voltage signal, $V_{RF}$, the n-channel transistor pair provides a substantially constant current signal. It will be appreciated that in other embodiments of the invention input voltage signals may be compared with a first and second reference voltage signals $V_{RF1}$ and $V_{RF2}$, instead of one reference voltage signal, $V_{RF}$, as described in the embodiment illustrated in FIG. 1.

Figure 4:
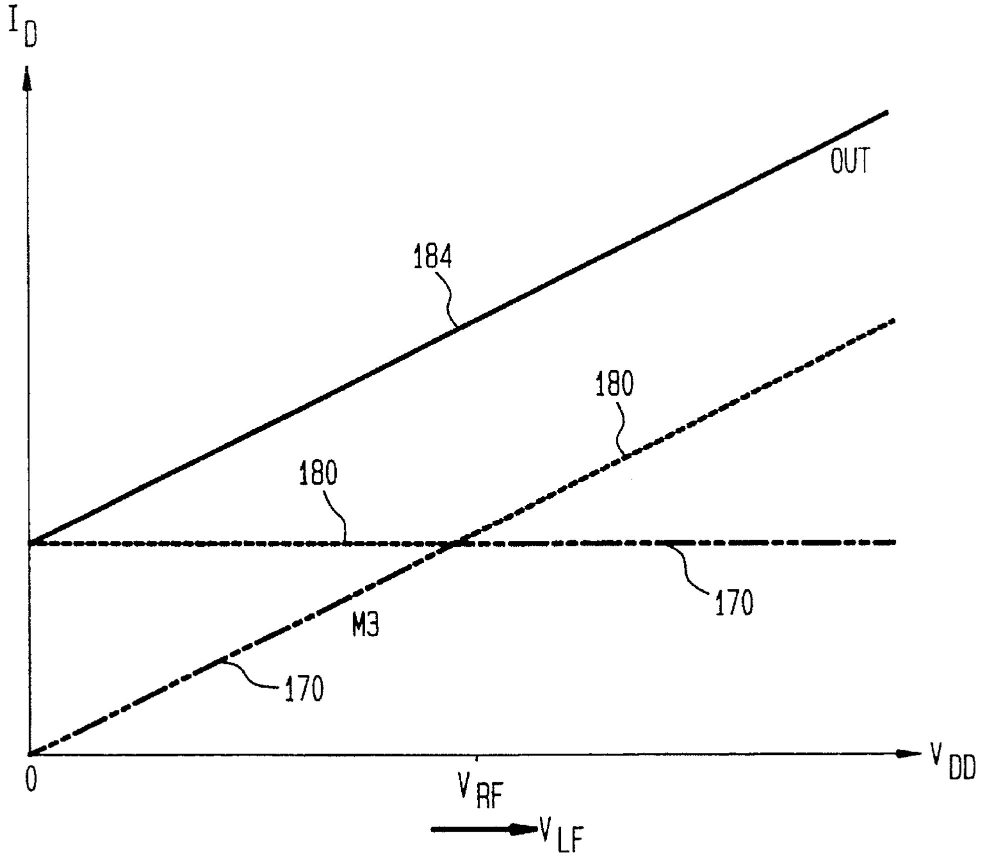
FIG. 4 is a plot illustrating the current/voltage characteristic of the embodiment of FIG. 1.

The current signals generated in current signal lines 132 and 134 are illustrated by curves 180 and 170 respectively, in FIG. 4. Curve 170 corresponds to the operation of the p-channel voltage-to-current converter, while curve 180 corresponds to the operation of the n-channel voltage-to-current converter. As illustrated, the output current signal characteristic, during the time that switch 112 is closed and switch 128 is open, is the sum of current signals represented by the substantially linear portion of curve 180 and the substantially flat portion of curve 170. The output current signal characteristic during the time that switch 112 is open and switch 128 is closed, is the sum of current signals represented by the substantially linear portion of curve 170 and the substantially flat portion of curve 180. The resultant output current signal, $I_{OUT}$, of voltage-to-current converter 100 is represented by curve 184 of FIG. 4. As illustrated curve 184 has a substantially linear slope for substantially the entire range of input voltage signals $V_{LF}$.

In some operating circumstances, when input voltage signal, $V_{LF}$, has an amplitude in the vicinity of reference voltage signal $V_{RF}$, the output current signal may exhibit substantial discontinuity. This discontinuity is typically caused by voltage offsets and current mismatches. This problem may be reduced by the introduction of a hysteresis loop, of a suitable width, in the operation of comparator and control circuit 124. For acceptable results, it is desirable to adjust the width of the hysteresis loop to be larger than the expected input voltage signal region within which offsets and mismatches may affect the operation of the circuit.

Figure 5:
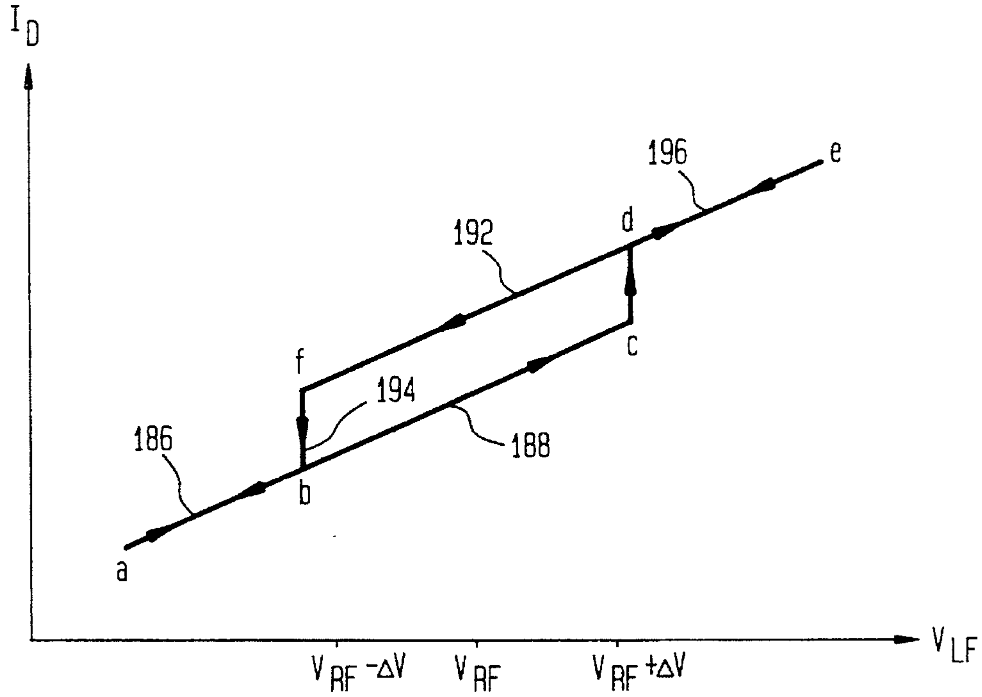
FIG. 5 is a plot illustrating a hysteresis loop that may be introduced into an embodiment of a voltage-to-current converter in accordance with the present invention, such as the embodiment of FIG. 1.

FIG. 5 illustrates the effect of such a hysteresis loop, which may be introduced into the current/voltage characteristic of an embodiment of a voltage-to-current converter in accordance with the present invention. In FIG. 5, the central region of the curve is expanded for more clarity. As illustrated, the output current signal, $I_{OUT}$, remains substantially continuous. For input voltage signals, $V_{LF}$, rising from zero volts to $V_{RF}+\Delta v$ the output current signal follows path abcde along the hysteresis loop. Conversely, for input voltage signals $V_{LF}$, decreasing from $V_{DD}$ toward $V_{RF}-\Delta v$, the output current signal follows path edfba along the hysteresis loop. The amount of hysteresis is such that the discontinuity cd is contained within the segment df, and the discontinuity of fb is contained within the segment bc.

Figure 6:
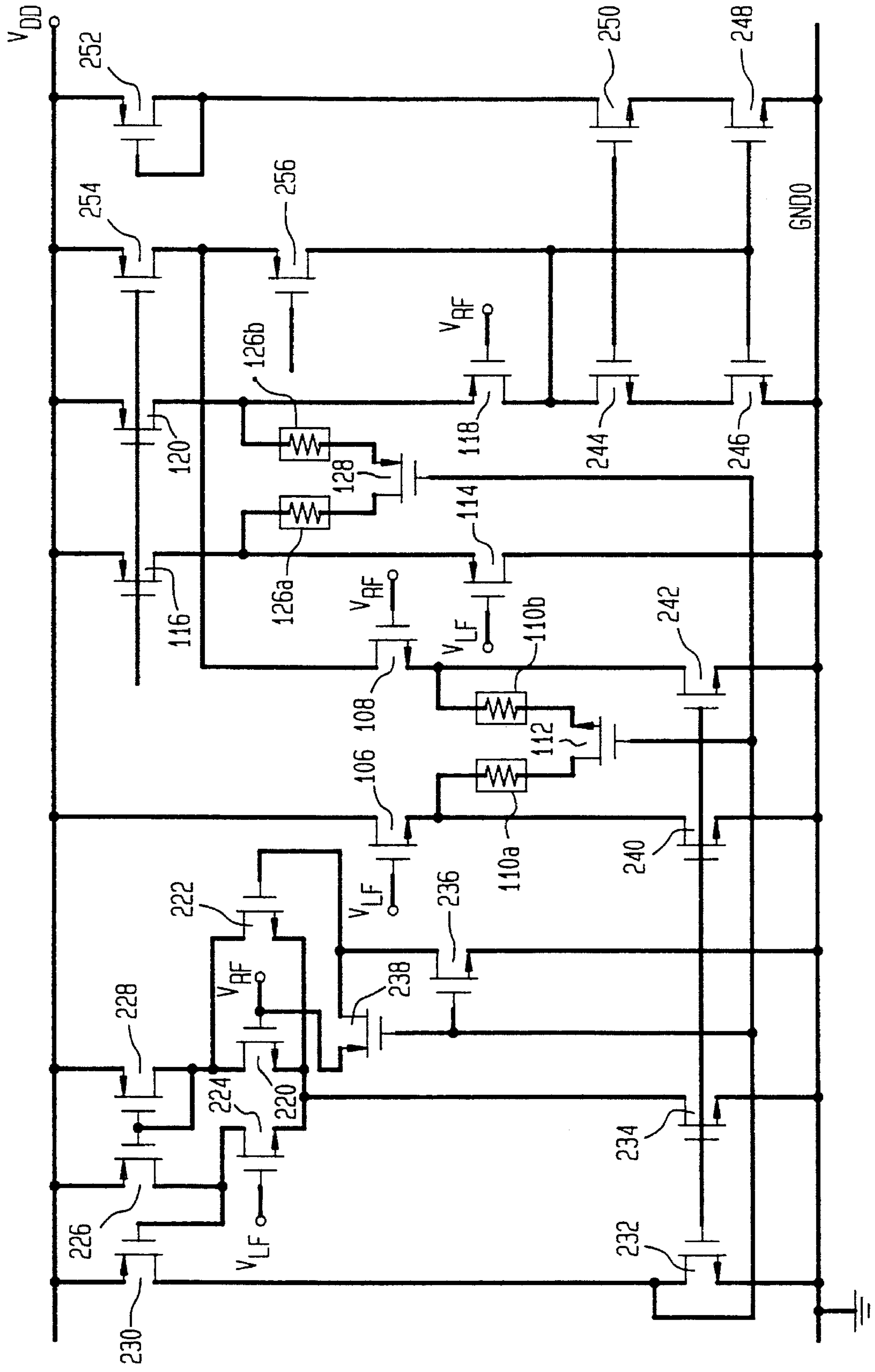
FIG. 6 illustrates a transistor schematic diagram of the embodiment of FIG. 1.

FIG. 6 illustrates a transistor level schematic of one embodiment of a voltage-to-current converter in accordance with the present invention, employing MOSFET transistors, although the invention is not limited in scope to the configuration illustrated in FIG. 6, and specifically not to such MOSFET transistors. The n-channel voltage-to-current converter comprises: transistors 106, 108; resistor 110, which in this embodiment, is split into resistors 110*a* and 110*b;* switch 112 coupling the two resistors; and transistors 240 and 242, which operates as biasing current sources. The drain of transistor 108 is coupled to the drain of transistor 254, which operates as a current source. Transistor 256 is employed to form a cascode arrangement in combination with transistor 254. This cascode arrangement substantially reduces any current errors arising in the operation of transistor current source 254. The operation of cascode arrangements is well-known and described in *Microelectronics, Digital and Analog Circuits and Systems*, by Jacob Millman (McGraw Hill, 1979), incorporated herein by reference.

The p-channel voltage-to-current converter is formed by transistors 114 and 118, resistor 126, which is split into two resistors 126*a* and 126*b*, switch 128 coupling the two resistors, and transistors 120 and 116, which operate as biasing current sources. The drain of transistor 118 is coupled to the drain of transistor 244. Thus, the current signals generated from p-channel and n-channel converters are summed in the combination arrangement of transistors 244 and 246. Transistors 248 and 250 whose gate terminals are respectively coupled to the gate terminals of transistors 244 and 246, operate as current mirrors, so that the current signal flowing through transistors 250 and 248 corresponds to the current signal flowing through transistors 244 and 246. Transistor 252, whose gate and drain terminals are coupled together and to the drain of transistor 250 draws the same current provided in the current mirror formed by transistors 250 and 248.

Thus, transistor 248 may be employed as a current mirror in combination with an external transistor (not shown) to provide a current to an external circuit (not shown) in response to an input voltage signal, $V_{LF}$. In accordance with one embodiment of the invention, transistor 248 operates as a control current source that provides a current signal to a current-controlled ring oscillator, such as described in a concurrently filed patent application, incorporated herein by reference, entitled "Ring Oscillator" (Lakshmikumar 5), by K. Lakshmikumar.

The comparator and control functions, in combination with a hysteresis loop arrangement, are accomplished by transistors 224, 220, 222, 226, 228, 232, 234, 230, 238 and 236. Transistors 224 and 220 form a differential pair, and operate as a comparator. Voltage reference signal, $V_{RF}$, is applied to the gate of transistor 220, while input voltage signal, $V_{LF}$, is applied to the gate of transistor 224. Transistor 222 may be coupled, in parallel, to transistor 220 via a p-channel switch transistor 238. Voltage reference signal, $V_{RF}$, is applied to the gate of transistor 222, when switch transistor 238 is closed. For this configuration, transistors 220, 222 and transistor 224 operate as a comparator. The drain of transistor 238 is coupled to the gate of transistor 222 and to the drain of another switching transistor 236. The gate of transistor 236 is coupled to the gate of transistor 238, such that when transistor switch 238 is "off", transistor 236 is "on" and vice-versa. When transistor 238 is "on", and transistor 236 is "off", transistor 222 is coupled in parallel with transistor 220. However, when transistor 236 is "on", the gate of transistor 222 is "pulled" to ground. In response, transistor 222 turns "off." Thus, transistors 220 and 222 are no longer coupled in parallel. Transistors 228 and 226 form a differential-to-single current converter for the differential current signal generated at transistors 220 and 224, or transistors 220, 222 and 224. Transistors 230 and 232 operate as a gain stage for the differential input pair formed by transistors 220 and 224, or the differential input pair formed by transistors 220, 222 and 224.

The dimensions of transistors 224, 220 and 222 are such that the comparator formed from these transistors operates along a hysteresis loop, such as the one represented in FIG. 5. For example, in one embodiment of the invention, transistor 224 has a width of 50 μm and a length of 6 μm. Transistor 220 has a width of 40 μm and a length of 6 μm. Transistor 222 has a width of 20 μm and a width of 6 μm. When switch 238 is closed and transistors 222 and 220 are coupled in parallel, the effective width of the combination transistor pair 222 and 220 is 60 μm. However, when switch 238 is open, transistors 222 and 220 are not coupled, and the effective width of the combination transistor 222 and 220 is attributable to transistor 220, which is 40 μm.

During the operation of the embodiment of a voltage-to-current converter in accordance with the invention represented in FIG. 6, for rising input voltage signals, $V_{LF}$, that have an amplitude less than the reference voltage signal, $V_{RF}$, the voltage signal at the drain of transistor 224 becomes "high" and the voltage signal at the drain of transistor 230 becomes "low". In response, transistor 238 switches "on", and transistors 220 and 222 are coupled in parallel. For this arrangement, the input voltage signal, $V_{LF}$, is applied to transistor 224 and voltage reference signal $V_{RF}$ is applied to the combination transistor pair 220 and 222, coupled in parallel. The effective width of transistor 220 and 222, coupled in parallel, is 60 μm. Since the effective width of transistors 220 and 222 is larger than the width of transistor 224, when input voltage signal, $V_{LF}$, is larger than reference voltage signal, $V_{RF}$, the comparator switches its state. Specifically, when $V_{LF}>V_{RF}+\Delta V$, the comparator switches its state and the voltage signal at the drain of transistor 224 becomes "low." In response, transistor 230 turns "on", and the voltage signal at the drain of transistor 230 goes to $V_{DD}$. In response, transistor switch 238 turns "off" and transistors 220 and 222 are no longer coupled. Meanwhile, transistor 236 turns "on", and the gate of transistor 222 goes to approximately zero volts. Because the voltage signal at the drain of transistor 230 is "high", it operates as an activating signal to turn transistor 112 "on", causing resistors 110*a* and 110*b* to be coupled. Furthermore, because transistor 222 is "off", it does not affect the operation of transistor 220.

For the arrangement, where transistor 220 and 222 are not coupled, the effective width of the transistor that receives the reference voltage signal, $V_{RF}$, is 40 μm, which is attributable to transistor 220. The effective width of transistors 220 and 222 is now smaller than the width of transistor 224. When input voltage signal, $V_{LF}$, is smaller than reference voltage signal, $V_{LF}$, the comparator switches its state. Thus, when input voltage signal $V_{RF}$ decreases from amplitudes larger than $V_{RF}+\Delta V$, to below $V_{RF}$ such that $V_{LF}<V_{RF}-\Delta V$, the voltage signal at the drain of transistor 224 becomes "high" and the comparator switches its state again. In response, transistor 230 turns "off", and the voltage signal at the drain of transistor 230 goes to approximately zero volts. Transistor switch 238 turns "on", and transistors 220 and 222 become coupled again, in parallel. Meanwhile, transistor 236 turns "off", and the gate of transistor 222 is coupled to reference voltage signal, $V_{RF}$. Because the voltage signal at the drain of transistor 230 is "low", it operates as an activating signal to turn transistor 128 "on", causing resistors 126*a* and 126*b* to be coupled. Thus, the comparator follows the hysteresis loop, as explained above.

It will be appreciated that although the embodiment of a voltage-to-current converter in accordance with the present invention described herein operates with a DC power supply that generates voltage signal levels ranging from "0" volts to $V_{DD}$ in other embodiments of the invention, a DC power supply that generates voltage signal levels within other ranges, for example, "0" volts to "$-V_{DD}$" may be utilized. In that case, the transistors forming the voltage-to-current converter may be conveniently reconfigured to operate in accordance with the present invention.

It will be further appreciated that an embodiment of a voltage-to-current converter in accordance with the present invention may be used, for example, in a phase-locked loop, such as the circuit represented in FIG. 7. Thus, voltage-to-current converter 268 may comprise an embodiment of a voltage-to-current converter in accordance with the invention, such as represented in FIGS. 1 and 6, and yield a substantially linear current/voltage characteristic over substantially the entire range of loop filter voltage, $V_{LF}$.

A voltage-to-current converter in accordance with the present invention has many benefits and advantages over conventional voltage-to-current converters. For example, it exhibits a linear current/voltage characteristic over substantially the entire range of input voltage signal. This characteristic allows for better performance in many electronic applications that employ a voltage-to-current converter. Furthermore, since the dynamic range of a voltage-to-current converter in accordance with the present invention is wider than conventional voltage-to-current converters, and provides a substantially rail-to-rail linear response, it is possible to use the converter in systems that use a smaller voltage signal supply $V_{DD}$ than voltage signal supplies used in prior art systems.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

What is claim is:

1. A voltage-to-current converter operated by a power supply generating a predetermined voltage signal supply ranging between a high and a low voltage level, for converting an input voltage signal to an output current signal, comprising:

a first voltage-to-current converter having a substantially linear voltage/current characteristic for voltage input signals smaller than a first reference voltage signal level and up to voltage signal levels substantially equal to said low voltage level;

a second voltage-to-current converter having a substantially linear voltage/current characteristic for voltage input signals larger than a second reference voltage signal level and up to voltage levels substantially equal to said high voltage level; and a control circuit coupled to said first and second voltage-to-current converters, said control circuit being adapted to activate said first voltage-to-current converter and deactivate said second voltage-to-current converter when said input voltage signal is smaller than said first reference voltage signal level, said control circuit being further adapted to activate said second voltage-to-current converter and deactivate said first voltage to current converter when said input voltage signal is larger than said second reference voltage signal level.

2. A voltage-to-current converter according to claim 1, wherein said first and second reference voltage signals are substantially equal.

3. A voltage-to-current converter according to claim 1, wherein said first voltage-to-current converter further comprises first and second n-channel transistors and said second voltage-to-current converter further comprises first and second p-channel transistors.

4. A voltage-to-current converter according to claim 3, further comprising a first resistor adapted to couple the sources of said n-channel transistors, and a second resistor adapted to couple the sources of said p-channel transistors.

5. A voltage-to-current converter according to claim 4, further comprising a first and a second switch, said first resistor adapted to be coupled to said sources of n-channel transistors upon activation of said first switch, and said second resistor adapted to be coupled to said sources of p-channel transistors upon activation of said second switch.

6. A voltage-to-current converter according to claim 5, wherein said first and second switch comprises a transistor adapted to be electronically actuated and deactuated in response to a switching signal.

7. A voltage-to-current converter according to claim 5, wherein said control circuit further comprises a comparator adapted so as to compare said input voltage signals with said first and second reference voltage signals, said comparator being adapted to provide a voltage signal to activate said first and second switch.

8. The voltage-to-current converter according to claim 7, wherein said comparator comprises a differential input stage having a first and a second transistor adapted so as to receive said input voltage signals and said first and second reference voltage signals, said differential input stage being adapted to provide said voltage signal provided by said comparator for activating said first and second switch.

9. A voltage-to-current converter according to claim 8, wherein said control circuit further comprises a third transistor coupled to said second transistor in a switching configuration so as to introduce a hysteresis effect in said control circuit during operation.

10. A method for converting an input voltage signal to an output current signal, comprising the steps of:

generating a first output current signal in response to input voltage signals having an amplitude less than a first reference voltage signal such that said first output current signal is a substantially linear function of said input voltage signals;

generating a second output current signal in response to said input voltage signals having an amplitude larger than a second reference voltage signal such that said second current signal is a substantially linear function of said input voltage signals;

combining said first and second output current signals so as to provide a substantially linear signal over a range of input voltage signals.

11. The method of converting an input voltage signal to an output current signal according to claim 10, wherein said first and second reference voltage signals are substantially equal; and the step of combining further comprises combining said first and second output current signals so as to provide a substantially linear signal over a range of input voltage signals substantially ranging from zero volts to a predetermined voltage level.

12. The method of convening an input voltage signal to an output current signal according to claim 10, wherein the step of generating a first output current signal further comprises the steps of:

activating a first voltage-to-current converter that has a substantially linear characteristic in response to input voltage signals having an amplitude less than said first reference voltage signal: and applying said input voltage signals having an amplitude less than said first reference voltage signal to said first voltage-to-current converter.

13. The method for convening an input voltage signal to an output current signal according to claim 12, wherein said step of generating a second linear output current signal further comprises the steps of:

activating a second voltage-to-current converter that has a substantially linear characteristic in response to input voltage signals having an amplitude larger than said second reference voltage signal; and applying said input voltage signals having an amplitude larger than said second reference voltage signals to said second voltage-to-current converter.

14. A method for converting an input voltage signal to an output current signal comprising the steps of:

activating a first substantially linear voltage-to-current converter in response to rising input voltage signals having an amplitude smaller than a first reference voltage signal;

activating a second substantially linear voltage-to-current converter in response to rising input voltage signals having an amplitude larger than said first reference voltage signal;

activating said second linear voltage-to-current converter in response to falling input voltage signals having an amplitude larger than a second reference voltage signal, said second reference voltage signal being smaller than said first reference voltage signal; and activating said first linear voltage-to-current converter in response to falling input voltage signals having an amplitude smaller than said second reference voltage signal.

15. The method for converting an input voltage signal to an output voltage signal according to claim 14, wherein the step of activating said first voltage-to-current converter further comprises the steps of comparing said rising input voltage signals with said first reference voltage signal and generating a voltage signal to activate a switch in said first voltage-to-current converter when said rising voltage signals are smaller than said first reference voltage signal.

16. The method for converting an input voltage signal to an output voltage signal according to claim 15, wherein the step of activating said second voltage-to-current converter in response to a rising input voltage signal further comprises the steps of comparing said rising input voltage signals with said second reference voltage signal and generating a voltage signal to activate a switch in said second voltage-to-current converter when said rising voltage signals are larger than said first reference voltage signal.

17. The method for converting an input voltage signal to an output current signal according to claim 16, wherein the step of activating said second voltage-to-current converter in response to a falling input voltage signal further comprises the steps of comparing said falling input voltage with said first reference voltage signal and generating a voltage signal to activate a switch in said second voltage-to-current converter when said falling voltage signal is smaller than said first reference voltage signal.

18. A method for converting an input voltage signal to an output current signal according to claim 16, wherein the step of activating said first voltage-to-current converter in response to said falling input voltage signal further comprises the step of comparing said falling input voltage signals with said second reference voltage signal and generating a voltage signal to activate a switch in said first voltage-to-current converter when said falling input voltage signal is smaller than said second reference voltage signal.

* * * * *